United States Patent
Huang et al.

(10) Patent No.: US 11,542,644 B2
(45) Date of Patent: *Jan. 3, 2023

(54) METHOD OF PREPARING POLYESTER ELASTOMER MELTBLOWN NONWOVEN FABRIC MEMBRANE WITH POROUS AND HIGH BONDING STRENGTH

(71) Applicant: Taiwan Textile Federation, R.O.C., Taipei (TW)

(72) Inventors: Shu-Hui Huang, Taipei (TW); Sheng-Jen Lin, Taipei (TW); Yao-Hung Kuo, Taipei (TW); Jian-Fan Chen, Taipei (TW); Yun-Chin Kuo, Taipei (TW); Yu-Chuan Lin, Taipei (TW)

(73) Assignee: TAIWAN TEXTILE FEDERATION, R.O.C., Taipei (TW)

( * ) Notice: Subject to any disclaimer, the term of this patent is extended or adjusted under 35 U.S.C. 154(b) by 360 days.

This patent is subject to a terminal disclaimer.

(21) Appl. No.: 16/885,144

(22) Filed: May 27, 2020

(65) Prior Publication Data
US 2021/0372018 A1 Dec. 2, 2021

(51) Int. Cl.
*D04H 3/16* (2006.01)
*D04H 3/011* (2012.01)
*D01D 5/098* (2006.01)
*D01F 6/82* (2006.01)

(52) U.S. Cl.
CPC ............ *D04H 3/16* (2013.01); *D01D 5/0985* (2013.01); *D01F 6/82* (2013.01); *D04H 3/011* (2013.01)

(58) Field of Classification Search
CPC .............................. D04H 3/16; D01D 5/0985
See application file for complete search history.

(56) References Cited

U.S. PATENT DOCUMENTS

2021/0371610 A1* 12/2021 Huang .................... C08J 5/18

* cited by examiner

*Primary Examiner* — Jeffry H Aftergut
(74) *Attorney, Agent, or Firm* — Chun-Ming Shih; HDLS IPR Services (57) ABSTRACT

A method of preparing polyester elastomer meltblown nonwoven fabric membrane with porous and high bonding strength includes the following steps of: (a) Adding a reaction solvent to a reaction solvent to thermoplastic polyester elastomer (TPEE) powder or granules to prepare a solvent mixture. (b) Adding a modifier to the solvent mixture, and mixing uniformly to prepare a first mixture, the modifier includes at least one of o-xylylenediamine, m-xylylenediamine, alpha, alpha'-diamino-p-xylene, 2,3,5,6-Tetrachloro-p-xylene-alpha,alpha'-diamine, and 1,3,5,7-Tetraazatricyclodecane. (c) Adding an initiator to the first mixture, and mixing uniformly to prepare a second mixture. (d) Drying the second mixture to form a masterbatch, and (e) preparing the polyester elastomer meltblown nonwoven fabric membrane by passing the masterbatch through a meltblown process.

7 Claims, 4 Drawing Sheets

METHOD OF PREPARING POLYESTER ELASTOMER MELTBLOWN NONWOVEN FABRIC MEMBRANE WITH POROUS AND HIGH BONDING STRENGTH

BACKGROUND

Technical Field

The present disclosure relates to a method of preparing polyester elastomer meltblown nonwoven fabric membrane with porous and high bonding strength, and more particularly to a method of preparing polyester elastomer meltblown nonwoven fabric membrane that has similar material characteristics with polyester fiber.

Description of Related Art

The statements in this section merely provide background information related to the present disclosure and do not necessarily constitute prior art.

In present social environment, due to the rise of environmental protection awareness, more and more attention is paid to product recycling capabilities, and whether secondary environmental pollution will be caused after recycling. Now, most of the strips used for the bonding between textile materials of textiles are made of thermosetting polyurethane (PU) or thermoplastic polyurethane elastomer (TPU), and most of them have di-isocyanate, which are highly toxic and easily cause environmental pollution and human organ damage. Moreover, because the strips are not environmentally friendly materials, when the textiles are melted and recycled, the thermosetting polyurethane or the thermoplastic polyurethane elastomer generates residues due to melting, resulting in a situation in which recovery is not easy.

Although the material of the thermoplastic polyester elastomer (TPEE) and the material of the polyester fiber commonly used in textile products are approximately the same material, their application in polyester fiber material should have better compatibility. However, due to the poor conformability and elastic recovery rate of TPEE material, there is no related application that uses the TPEE as a bonding material of the polyester fiber.

Therefore, how to design a method of preparing polyester elastomer meltblown nonwoven fabric membrane with porous and high bonding strength, which modifies TPEE film by a compound to improve bonding strength and elastic recovery rate of the TPEE film, and then preparing the polyester elastomer meltblown nonwoven fabric membrane, it is an important subject studied by the inventor of the present disclosure.

SUMMARY

In order to solve the above problems, the present disclosure provides a method of preparing method of preparing polyester elastomer meltblown nonwoven fabric membrane with porous and high bonding strength to overcome the problems in the prior art. The method of preparing polyester elastomer meltblown nonwoven fabric membrane with porous and high bonding strength includes the following steps: Adding a reaction solvent with 0.5-20 parts by weight to thermoplastic polyester elastomer (TPEE) powder or granules to prepare a solvent mixture, the reaction solvent being methyl formate or ethyl acetate. Adding a modifier with 0.5-10 parts by weight to the solvent mixture, and mixing uniformly to prepare a first mixture, the modifier including at least one of o-xylylenediamine, m-xylylenediamine, alpha, alpha'-diamino-p-xylene, 2,3,5,6-Tetrachloro-p-xylene-alpha,alpha'-diamine, and 1,3,5,7-Tetraazatricyclodecane. Adding an initiator with 0.5-20 parts by weight to the first mixture, and mixing uniformly to prepare a second mixture, the initiator including a photo initiator or a thermal initiator. Drying the second mixture in environment with a temperature between 95° C. and 115° C. to form a masterbatch with a moisture content of 500 to 1000 ppm. Preparing the polyester elastomer meltblown nonwoven fabric membrane by passing the masterbatch through a meltblown process.

Further, a weight average molecular weight of the TPEE powder or granules is between 10000 and 30000, the Shore hardness of the TPEE powder or granules is between 50 A and 100 A, and a melting point of the TPEE powder or granules with a temperature between 40° C. and 180° C.

Further, the reaction solvent with 10 parts by weight, the modifier with 5 parts by weight, and the initiator with 10 parts by weight.

Further, the initiator and the first mixture are uniformly mixed as the second mixture at a rotation speed between 3 rpm and 7 rpm and at a temperature between 150° C. and 200° C.

Further, the rotation speed is 5 rpm, and the temperature is 180° C.

Further, the meltblown process is that the masterbatch is extruded by a single screw extruder and melted by heating to form a polyester elastomer melt, the polyester elastomer melt is filtered by a filter screen of a filter to form a filter melt, and then the filter melt is sprayed by a hot air to a carrier to form the polyester elastomer meltblown nonwoven fabric membrane.

Further, the second mixture is dried in environment with a temperature 105° C.

A main purpose and effect of the present disclosure is that, because of the material of the TPEE and the material of the polyester elastomer meltblown nonwoven fabric membrane are approximately the same material. Therefore, when the polyester elastomer meltblown nonwoven fabric membrane is attached to clothing made by PET fabric, the materials are approximately the same, so there has high compatibility and high bonding strength after bonding both. Furthermore, the water pressure that can be withstood at bonding part can reach more than 10000mmH$_2$O.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The technical content and detailed description of the present disclosure will be described below in conjunction with the drawings.

The present disclosure provides a method of preparing polyester elastomer meltblown nonwoven fabric membrane 100 with porous and high bonding strength, the method includes the following steps: (a) Adding a reaction solvent with 0.5-20 parts by weight to thermoplastic polyester elastomer (TPEE) powder or granules to prepare a solvent mixture, the reaction solvent is methyl formate or ethyl acetate. (b) Adding a modifier with 0.5-10 parts by weight to the solvent mixture, and mixing uniformly to prepare a first mixture, the modifier including at least one of o-xylylenediamine, m-xylylenediamine, alpha, alpha'-diamino-p-xylene, 2,3,5,6-Tetrachloro-p-xylene-alpha,alpha'-diamine, and 1,3,5,7-Tetraazatricyclodecane. (c) Adding an initiator with 0.5-20 parts by weight to the first mixture, and mixing uniformly to prepare a second mixture, the initiator including a photo initiator or a thermal initiator. (d) Drying the second mixture in environment with a temperature between 95° C. and 115° C. to form a masterbatch with a moisture content of 500 to 1000 ppm. (e) Finally, preparing the polyester elastomer meltblown nonwoven fabric membrane 100 by passing the masterbatch through a meltblown process.

Specifically, in step (a), a weight average molecular weight of the TPEE powder or granules is between 10000 and 30000, the Shore hardness of the TPEE powder or granules is between 50 A and 100 A, and a melting point of the TPEE powder or granules with a temperature between 40° C. and 180° C. The chemical structure of the TPEE powder or granules is as follows:

The reaction solvent can be methyl formate or ethyl acetate, the addition range of the reaction solvent is between 0.5 and 20 parts by weight (relative to the TPEE powder or granules) to produce better solvent mixture, and the quality of the polyester elastomer meltblown nonwoven fabric membrane 100 produced by the solvent mixture is also better. When addition amount of the reaction solvent is 10 parts by weight, the quality of the produced solvent mixture and the corresponding polyester elastomer meltblown nonwoven fabric membrane 100 produced is the best.

In one embodiment of the present disclosure, the value of the weight average molecular weight of the TPEE powder or granules is only the optimal value for preparing the polyester elastomer meltblown nonwoven fabric membrane 100. The TPEE powder or granules using the above values have better bonding strength and elastic recovery rate, but the present disclosure is not limited thereto. For example, a weight average molecular weight of the TPEE powder or granules is between 30000 and 100000 to prepare the polyester elastomer meltblown nonwoven fabric membrane 100.

In step (b), the modifier can use o-xylylenediamine with the chemical structure as follows:

The chemical structure of m-xylylenediamine as follows:

The chemical structure of alpha, alpha'-diamino-p-xylene as follows:

And the chemical structure of 1,3,5,7-Tetraazatricyclodecane as follows:

In alpha, alpha'-diamino-p-xylene, the other part of the benzene ring is connected to chlorine (that is, the position of the benzene ring 2, 3, 5, 6), so that it constitutes 2,3,5,6-Tetrachloro-p-xylene-alpha, alpha'-diamine which includes chlorine, and the chemical structure of the 2,3,5,6-Tetrachloro-p-xylene-alpha, alpha'-diamine as follows:

The modifier is a main raw material for grafting TPEE and modifying TPEE. The addition range of modifiers is between 0.5 and 10 parts by weight (relative to the TPEE powder or granules) to produce better first mixture, and the quality of the polyester elastomer meltblown nonwoven fabric membrane 100 produced by the first mixture is also better. Specifically, when addition amount of the modifier is insufficient (for example, less than 0.5 parts by weight), the range of chemical reaction is too small, resulting in the finished product as an unmodified nonwoven fabric membrane. Therefore, the bonding strength and elastic recovery rate of the finished product will be same as the unmodified nonwoven fabric membrane. However, when addition amount of modifier used is too much (for example, more than 10 parts by weight), the reaction is excessive, which causes the modifier to disintegrate the characteristics of the nonwoven fabric membrane. At this time, the finished product is relatively easy to break, and it will also make the finished product unable to smoothly fit on the textile material. Therefore, in order to improve the yield of the finished product during preparation, the addition range of the modifier is preferably between 0.5 and 10 parts by weight. When the addition amount of the modifier is 5 parts by weight, the quality of the first mixture and the polyester elastomer meltblown nonwoven fabric membrane 100 is the best.

In step (c), the initiator may be a photo initiator or a thermal initiator, and may be potassium persulfate, azobisisobutyronitrile or benzildimethylketal is the preferred type of initiator. The addition range of the initiator ranges is between 0.5 and 20 parts by weight (relative to the TPEE powder or granules) to produce a better second mixture. Specifically, a polymerization reaction of polymers does not occur for no reason, a mechanism that drives the polymerization reaction is often required. This mechanism requires energy such as light or heat to excite the monomer of the polymer to become an active center of chemical reaction, thereby starting the polymerization reaction. However, if the addition amount of the initiator is insufficient (for example, less than 3 parts by weight), the polymerization reaction is incomplete, so that the yield of the finished product decreases. If the addition amount of the initiator is too much (for example, more than 7 parts by weight), it will cause defects such as excessive chain ends of the molecular chains of the polymer, and also reduce the yield of the finished product. Therefore, the addition range of the initiator is preferably between 0.5 and 20 parts by weight. When the addition range of the initiator is 10 parts by weight, the quality of the second mixture and the polyester elastomer meltblown nonwoven fabric membrane 100 is the best.

In order to uniformly mix and fully react, an apparatus for mixing can be set under a mixing environment with a rotation speed of 3 rpm to 7 rpm, a temperature of 160° C. to 200° C., and the initiator and the first mixture are uniformly mixed as the second mixture. After the above-mentioned uniformly mixing, the modified molecular chain can fully react to graft one or both ends of the polyester polymer chain. When the rotation speed is set at 5 rpm and the temperature is set at 180° C., there has the best reaction efficiency.

In step (d), the second mixture after being uniformly mixed needs to be dried in environment with a temperature of 95° C. to 115° C. to reduce moisture content of the second mixture. It is beneficial to the quality of the polyester elastomer meltblown nonwoven fabric membrane 100 preparation during the injection meltblown process. Specifically, when the moisture content of the second mixture is too much, the moisture content of a melt sprayed by the meltblown process is too much, and the thickness of meltblown nonwoven fabric sprayed is susceptible to fluidity and unevenness. If the moisture content is insufficient, the fluidity of injected material will be insufficient, which will cause the melt sprayed by the meltblown process to not flow easily and easily produce blocky defective products. Therefore, the second mixture can control the moisture content at 500 ppm-1000 ppm as a better value. When the drying temperature is set under the environment of 105° C., the control of the moisture content of the second mixture and the drying rate are the best.

Figure 1:
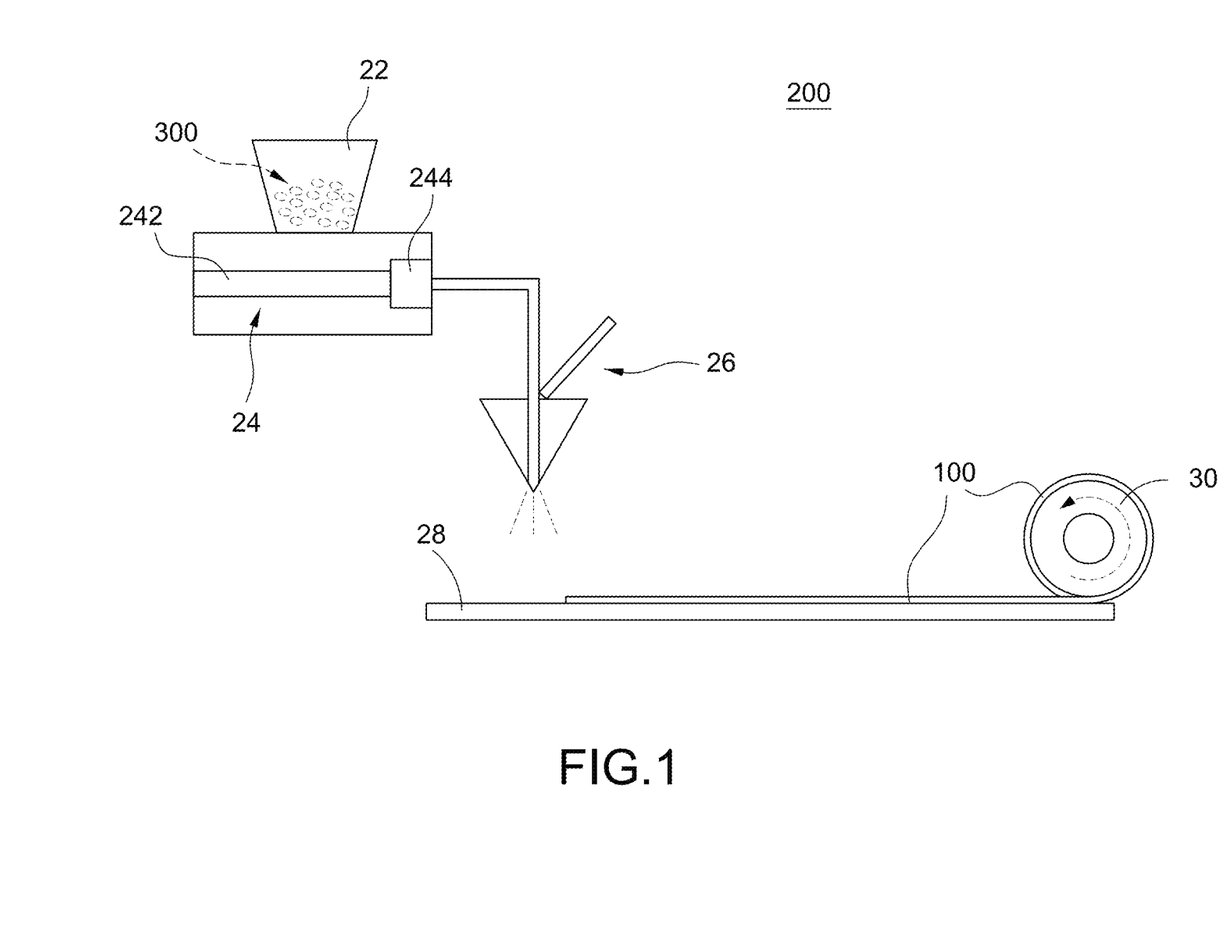
FIG. 1 is a schematic diagram of preparing a polyester elastomer meltblown nonwoven fabric membrane by passing a masterbatch through a meltblown process.

In step (e), after the second mixture is dried to become a masterbatch, the masterbatch is sprayed to a carrier by the meltblown process to polyester elastomer meltblown nonwoven fabric membrane 100. Specifically, please refer to FIG. 1, which is a schematic diagram of preparing a polyester elastomer meltblown nonwoven fabric membrane 100 by passing a masterbatch through a meltblown process. The meltblown process equipment 200 includes a trough 22, a heating box 24, a hot air nozzle 26, a conveying tray 28, and a winding wheel 30. The heating box 24 includes a single screw extruder apparatus 242 and a filter 244. The meltblown process is that adding the masterbatch 300 to the trough 22, and then entering the masterbatch 300 to the heating box 24 through the trough 22. The masterbatch 300 that has entered the heating box 24 is extruded by a single screw extruder of the single screw extruder apparatus 242 and melted by heating to form a polyester elastomer melt, the temperature of each zone of the single screw extruder is set at 160° C. to 190° C. and the pressure is set at about 15 bar. The polyester elastomer melt is filtered by a filter screen of the filter 244 to form a filter melt, the temperature of the filter 244 is also set at 160° C. to 190° C., and the mesh number of the filter screen metallized is 200-400 mesh. And then the filter melt is sprayed by a hot air from the hot air nozzle 26 to a carrier to form the polyester elastomer meltblown nonwoven fabric membrane 100. The air pressure of the hot air is set at 0.5 kg, and the temperature of the hot air is set at 190° C. Finally, the polyester elastomer meltblown nonwoven fabric membrane 100 is rolled into a roll by the conveyance of the conveying tray 28 and the winding of the winding wheel 30. The roll is wound at a length of 20 m to 200 m to make the polyester elastomer meltblown nonwoven fabric membrane 100 have a better thickness. It is worth mentioning that the parameter setting of the above meltblown process is only to consider the better parameters that can take into account both the output speed and the finished product yield, but it is not limited to this. This means that the actual parameters can be changed according to the actual demand (factors such as output speed, finished product yield, etc.).

Figure 2:
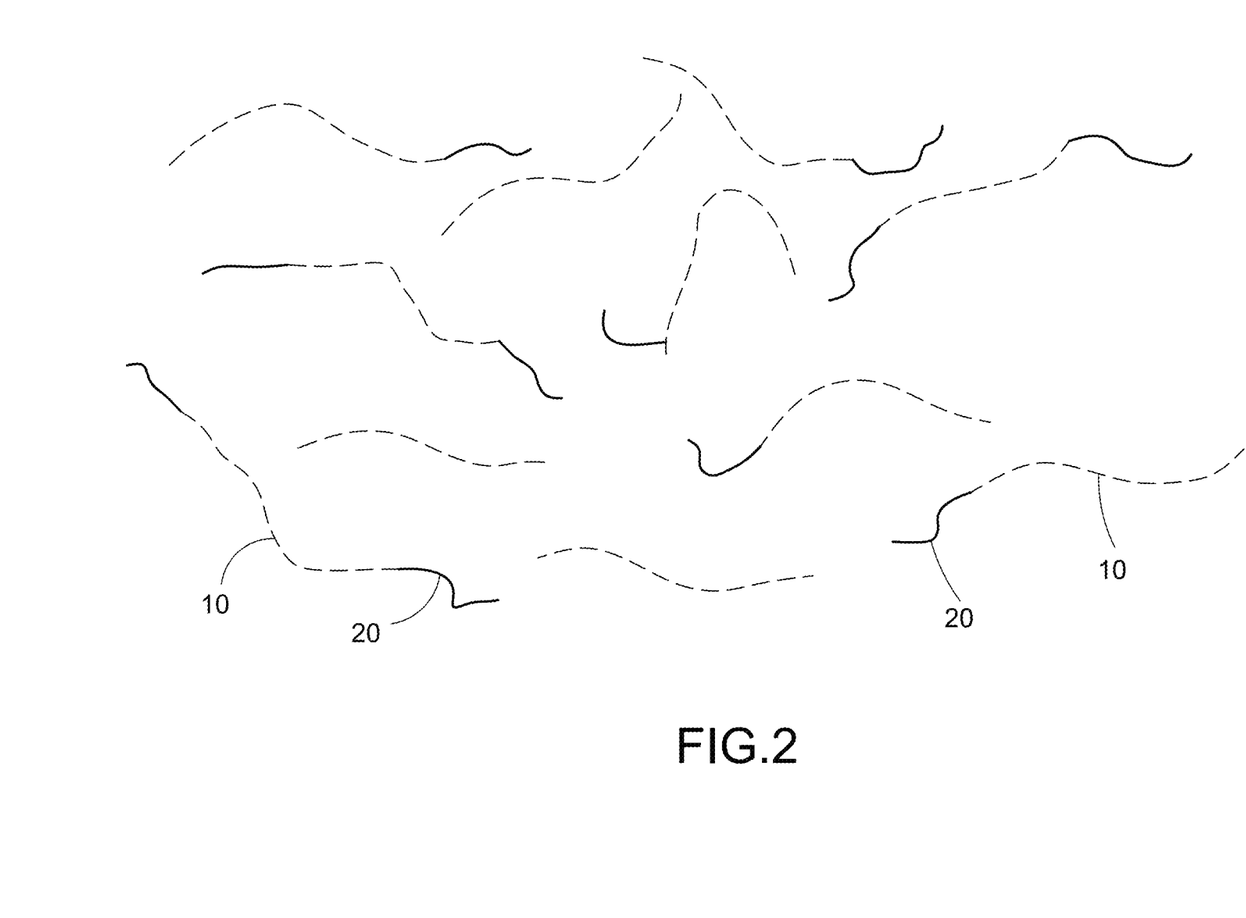
FIG. 2 is a schematic structural diagram of the polyester elastomer meltblown nonwoven fabric membrane with porous and high bonding strength.
Figure 3A:
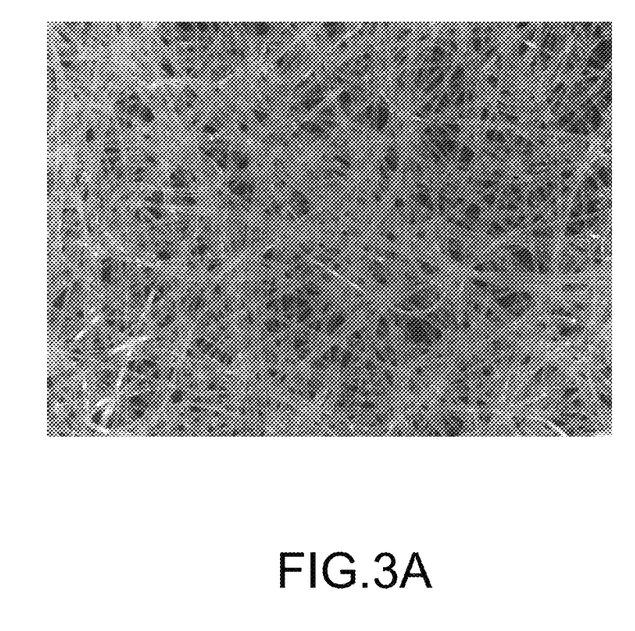
FIG. 3A is a schematic structural diagram of the polyester elastomer meltblown nonwoven fabric membrane with porous and high bonding strength under an electron microscope with 250 times magnification.
Figure 3B:
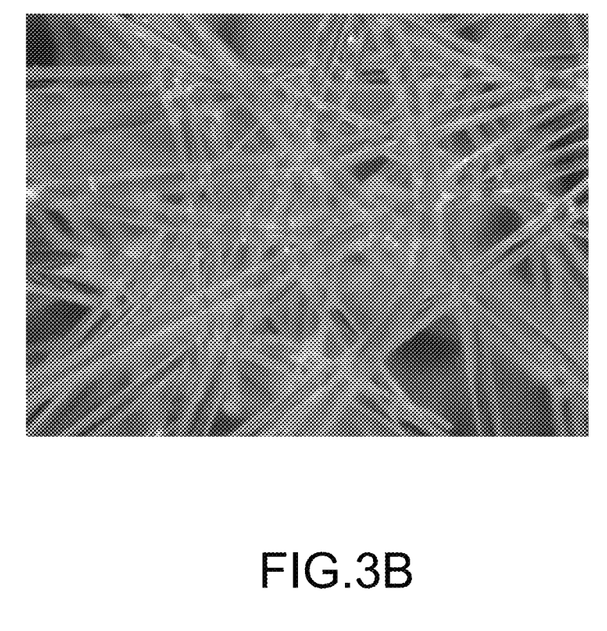
FIG. 3B is a schematic structural diagram of the polyester elastomer meltblown nonwoven fabric membrane with porous and high bonding strength under an electron microscope with 500 times magnification.
Figure 4:
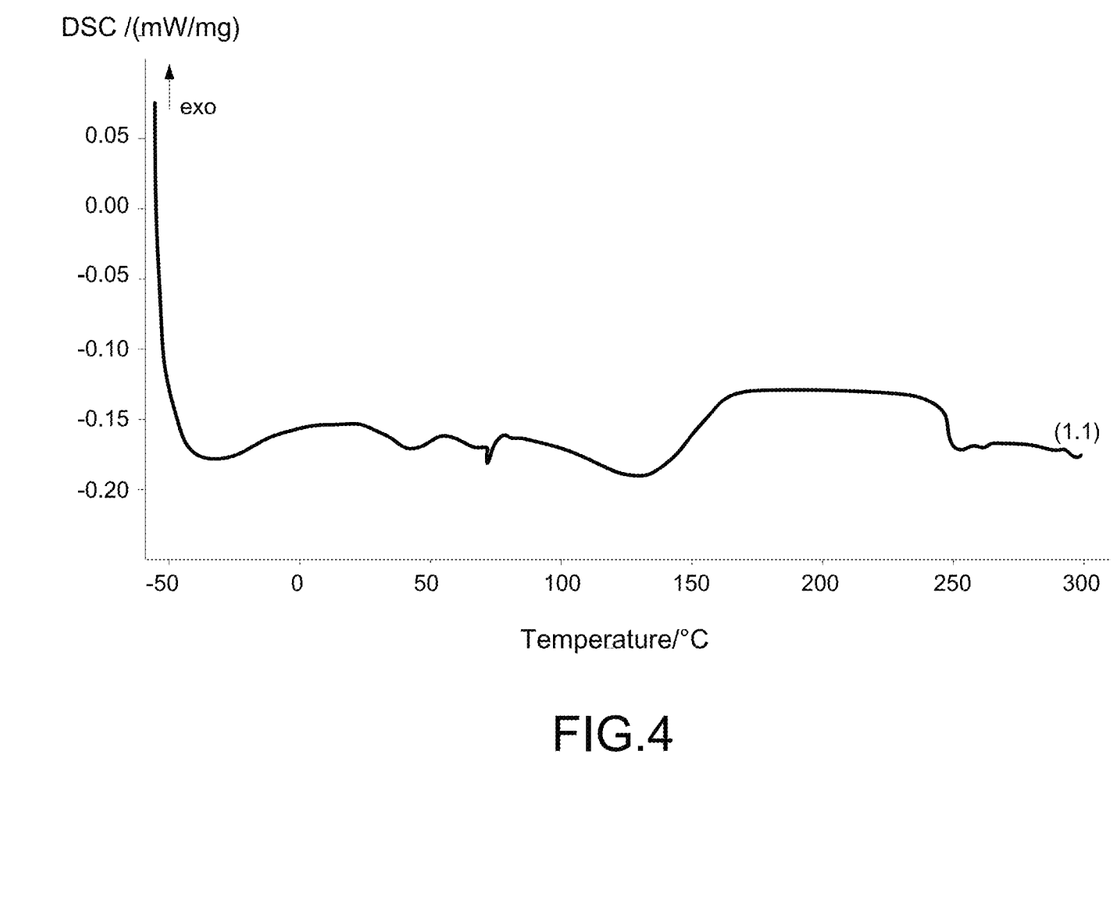
FIG. 4 is an analysis results diagram of the polyester elastomer meltblown nonwoven fabric membrane with porous and high bonding strength made by differential scanning calorimetry.

Please refer to FIG. 1 to FIG. 3B. FIG. 2 is a schematic structural diagram of the polyester elastomer meltblown nonwoven fabric membrane 100 with porous and high bonding strength. FIG. 3A is a schematic structural diagram of the polyester elastomer meltblown nonwoven fabric membrane 100 with porous and high bonding strength under an electron microscope with 250 times magnification. FIG. 3B is a schematic structural diagram of the polyester elastomer meltblown nonwoven fabric membrane 100 with porous and high bonding strength under an electron microscope with 500 times magnification. The structures observed using scanning electron microscope (SEM) with 250 times magnifications and 500 times magnifications are shown in FIG. 3A and FIG. 3B, respectively, and the schematic diagram of the structure is shown in FIG. 2. Referring to the FIG. 2, the polyester elastomer meltblown nonwoven fabric membrane 100 with porous and high bonding strength includes a plurality of polyester polymer chains 10 (indicated by broken lines) and a plurality of modified molecular chains 20 (indicated by solid lines). Each polyester polymer chain 10 includes two ends, and the polyester polymer chains 10 are stacked to constitute a main body of the polyester elastomer meltblown nonwoven fabric membrane 100. The modified molecular chain 20 is grafted to one or both ends of the polyester polymer chain 10 respectively, and since the ratio of the modifier is less than the TPEE powder or granules, not every polyester polymer chain 10 is grafted to at least one modified molecular chain 20. If the weight part of the modified molecular chain 20 is higher, the number of modified molecular chains 20 will increase, and the proportion of the modified molecular chain 20 grafted to the polyester polymer chain 10 will be higher. The modified molecular chain 20 enhances the elasticity of the polyester elastomer meltblown nonwoven fabric membrane 100.

The main purpose and effect of the present disclosure is that, because of the material of the TPEE and the material of the polyester elastomer meltblown nonwoven fabric membrane 100 are approximately the same material. Therefore, when the polyester elastomer meltblown nonwoven fabric membrane 100 is attached to clothing made by PET fabric, the materials are approximately the same, so there has high compatibility and high bonding strength after bonding both. Furthermore, the water pressure that can be withstood at bonding part can reach more than 10000mmH$_2$O. In addition, since most of the materials attached to textiles are made of thermosetting polyurethane (PU) or thermoplastic polyurethanes (TPU), they cannot be melted together with textiles because of incompatibility with textile materials (when the thermosetting polyurethane or the thermoplastic polyurethane elastomer melts, residues are generated). Since the polyester elastomer meltblown nonwoven fabric membrane 100 with porous and high bonding strength of the present disclosure has material characteristics similar to those of textile materials, the clothes made therefrom can be directly melted and recovered together, so the effect of high recycling compatibility can be achieved. Furthermore, the secondary purpose and efficacy of the present disclosure is that, since today's society is more and more concerned about the non-toxic living environment, the polyester elastomer meltblown nonwoven fabric membrane 100 produced of the disclosure does not add the highly toxic substances related to di-isocyanate. Therefore, the polyester elastomer meltblown nonwoven fabric membrane 100 can be used to make textiles with non-toxic materials.

Example 1

Adding ethyl acetate with 10 parts by weight to the TPEE powder or granules to prepare a solvent mixture, adding 2,3,5,6-Tetrachloro-p-xylene-alpha, alpha'-diamine with 5 parts by weight to the solvent mixture, and mixing uniformly to prepare a first mixture. And then, adding potassium sulfate with 10 parts by weight to the first mixture, and mixing uniformly in environment with a rotation speed of 5 rpm and a temperature of 180° C. to prepare a second mixture. Finally, it is dried in environment with a temperature of 105° C. to prepare the masterbatch with 750 ppm moisture content, and preparing the polyester elastomer meltblown nonwoven fabric membrane 100 by passing the masterbatch through the meltblown process. The finished product is analyzed by differential scanning calorimetry (DSC) as shown in FIG. 2. The test condition is 7 mg in weight, the temperature is between 25° C. and 350° C., and rise rate of the temperature is 10° C. per minute, it can be seen that the melting temperature of the finished product is about 130° C. The finished product was tested using the elastic recovery rate test of EN14704-1 and the peeling strength test of ISO 2411. The test conditions were 6×2 inch for the clamps, the distance between the upper clamp and lower clamp is 5 cm, the constant rate of extension (CRE) was 100 mm per minute, and use constant speed stretching to separate the polyester elastomer meltblown nonwoven fabric membrane 100 from the attached substrate (base fabric) and detect the "peeling strength (kgf/cm)". The obtained parameters are shown in Table 1 below.

Example 2

Adding methyl formate with 20 parts by weight to the TPEE powder or granules to prepare a solvent mixture, adding m-xylylenediamine with 10 parts by weight to the solvent mixture, and mixing uniformly to prepare a first mixture. And then, adding azobisisobutyronitrile with 20 parts by weight to the first mixture, and mixing uniformly in environment with a rotation speed of 7 rpm and a temperature of 200° C. to prepare a second mixture. Finally, it is dried in environment with a temperature of 115° C. to prepare the masterbatch with 1000 ppm moisture content, and preparing the polyester elastomer meltblown nonwoven fabric membrane 100 by passing the masterbatch through the meltblown process. The finished product is the same as the above test method, and the test results and parameters are shown in Table 1 below.

Example 3

Adding ethyl acetate with 0.5 parts by weight to the TPEE powder or granules to prepare a solvent mixture, adding o-xylylenediamine with 0.5 parts by weight to the solvent mixture, and mixing uniformly to prepare a first mixture. And then, adding azobisisobutyronitrile with 0.5 parts by weight to the first mixture, and mixing uniformly in environment with a rotation speed of 3 rpm and a temperature of 150° C. to prepare a second mixture. Finally, it is dried in environment with a temperature of 95° C. to prepare the masterbatch with 500 ppm moisture content, and preparing the polyester elastomer meltblown nonwoven fabric membrane 100 by passing the masterbatch through the meltblown process. The finished product is the same as the above test method, and the test results and parameters are shown in Table 1 below.

Example 4

Adding methyl formate with 5 parts by weight to the TPEE powder or granules to prepare a solvent mixture, adding alpha, alpha'-diamino-p-xylene with 7.5 parts by weight to the solvent mixture, and mixing uniformly to prepare a first mixture. And then, adding benzildimethyl-ketal with 5 parts by weight to the first mixture, and mixing uniformly in environment with a rotation speed of 4 rpm and a temperature of 190° C. to prepare a second mixture. Finally, it is dried in environment with a temperature of 110° C. to prepare the masterbatch with 650 ppm moisture content, and preparing the polyester elastomer meltblown nonwoven fabric membrane 100 by passing the masterbatch through the meltblown process. The finished product is the same as the above test method, and the test results and parameters are shown in Table 1 below.

Example 5

Adding ethyl acetate with 15 parts by weight to the TPEE powder or granules to prepare a solvent mixture, adding 1,3,5,7-Tetraazatricyclodecane with 2.5 parts by weight to the solvent mixture, and mixing uniformly to prepare a first mixture. And then, adding potassium persulfate with 15 parts by weight to the first mixture, and mixing uniformly in environment with a rotation speed of 6 rpm and a temperature of 170° C. to prepare a second mixture. Finally, it is dried in environment with a temperature of 100° C. to prepare the masterbatch with 850 ppm moisture content, and preparing the polyester elastomer meltblown nonwoven fabric membrane 100 by passing the masterbatch through the meltblown process. The finished product is the same as the above test method, and the test results and parameters are shown in Table 1 below.

Example 6

Adding methyl formate with 10 parts by weight to the TPEE powder or granules to prepare a solvent mixture, adding a modifier with 5 parts by weight to the solvent mixture, and mixing uniformly to prepare a first mixture. The modifier is prepared by adjusting the ratio of o-xylylenediamine, m-xylylenediamine, alpha, alpha'-diamino-p-xylene, and 1,3,5,7-Tetraazatricyclodecane to 25%: 25%: 25%: 25%. And then, adding azobisisobutyronitrile with 10 parts by weight to the first mixture, and mixing uniformly in environment with a rotation speed of 5 rpm and a temperature of 180° C. to prepare a second mixture. Finally, it is dried in environment with a temperature of 105° C. to prepare the masterbatch with 750 ppm moisture content, and preparing the polyester elastomer meltblown nonwoven fabric membrane 100 by passing the masterbatch through the meltblown process. The finished product is the same as the above test method, and the test results and parameters are shown in Table 1 below.

Comparative Example

The TPEE powder or granules are directly prepared as a polyester elastomer meltblown nonwoven fabric membrane 100. The finished product is the same as the above test method, and the test results and parameters are shown in Table 1 below.

TABLE 1 test parameters of examples and a comparative example

| | Comparative Example | Example 1 | Example 2 | Example 3 | Example 4 | Example 5 | Example 6 |
|---|---|---|---|---|---|---|---|
| Melt Flow Index (M.I.) | 4.8 | 30.5 | 33.5 | 32.9 | 32.5 | 31.3 | 31.9 |
| TFB (° C.) | 205.8 | 140.9 | 135.9 | 136.2 | 136.8 | 138.2 | 137.9 |
| DSC (° C.) | 144.9 | 137.8 | 123.8 | 124.6 | 125.9 | 130.2 | 131.1 |
| Peeling strength 175° C./25 s (0.15 mm) (kgf/cm) | 0 | 3.1 | 3.6 | 3.6 | 3.5 | 3.2 | 3.3 |
| Peeling strength 165° C./25 s (0.15 mm) (kgf/cm) | 0 | 2.2 | 2.8 | 2.7 | 2.7 | 2.5 | 2.4 |
| Peeling strength 135° C./25 s (Double sided heating) (0.15 mm) (kgf/cm) | 0 | 2.1 | 2.4 | 2.5 | 2.3 | 2.2 | 2.3 |
| elastic recovery rate test of EN14704-1 (%) | 70 (180° C.) | 83 (160° C.) | 90 (160° C.) | 88 (160° C.) | 85 (160° C.) | 84 (160° C.) | 84 (160° C.) |

The above table clearly shows that whether the modifier is a single compound or a mixed compound, all kind of the finished product have better peeling strength and better elastic recovery rate. The modifier uses chlorine-containing 2,3,5,6-Tetrachloro-p-xylene-alpha, alpha'-diamine, although the peeling strength and elastic recovery rate are poor, but the polyester elastomer meltblown nonwoven fabric membrane 100 has better flexibility. The comparative example 1 has a peeling strength of 0, cannot be bonded to textile materials, and the elastic recovery rate is not enough. The product of the comparative example cannot be restored to its original shape after being deformed.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A method of preparing polyester elastomer meltblown nonwoven fabric membrane with porous and high bonding strength, comprising the following steps of:

adding a reaction solvent with 0.5-20 parts by weight to thermoplastic polyester elastomer (TPEE) powder or granules to prepare a solvent mixture, the reaction solvent being methyl formate or ethyl acetate, adding a modifier with 0.5-10 parts by weight to the solvent mixture, and mixing uniformly to prepare a first mixture, the modifier including at least one of o-xylylenediamine, m-xylylenediamine, alpha, alpha'-diamino-p-xylene, 2,3,5,6-Tetrachloro-p-xylene-alpha, alpha'-diamine, and 1,3,5,7-Tetraazatricyclodecane, adding an initiator with 0.5-20 parts by weight to the first mixture, and mixing uniformly to prepare a second mixture, the initiator including a photo initiator or a thermal initiator, drying the second mixture in environment with a temperature between 95° C. and 115° C. to form a masterbatch with a moisture content of 500 to 1000 ppm, and preparing polyester elastomer meltblown nonwoven fabric membrane by passing the masterbatch through a meltblown process.

2. A method of preparing polyester elastomer meltblown nonwoven fabric membrane in claim 1, wherein a weight average molecular weight of the TPEE powder or granules is between 10000 and 30000, the Shore hardness of the TPEE powder or granules is between 50 A and 100 A, and a melting point of the TPEE powder or granules with a temperature between 40° C. and 180° C.

3. A method of preparing polyester elastomer meltblown nonwoven fabric membrane in claim 1, wherein the reaction solvent with 10 parts by weight, the modifier with 5 parts by weight, and the initiator with 10 parts by weight.

4. A method of preparing polyester elastomer meltblown nonwoven fabric membrane in claim 1, wherein the initiator and the first mixture are uniformly mixed as the second mixture at a rotation speed between 3 rpm and 7 rpm and at a temperature between 150° C. and 200° C.

5. A method of preparing polyester elastomer meltblown nonwoven fabric membrane in claim 4, wherein the rotation speed is 5 rpm, and the temperature is 180° C.

6. A method of preparing polyester elastomer meltblown nonwoven fabric membrane in claim 1, wherein the meltblown process is that the masterbatch is extruded by a single screw extruder and melted by heating to form a polyester elastomer melt, the polyester elastomer melt is filtered by a filter screen of a filter to form a filter melt, and then the filter melt is sprayed by a hot air to a carrier to form the polyester elastomer meltblown nonwoven fabric membrane.

7. A method of preparing polyester elastomer meltblown nonwoven fabric membrane in claim 6, wherein the second mixture is dried in environment with a temperature 105° C.

* * * * *